May 23, 1961 W. H. LETZ 2,985,211
FEED CUTTER
Filed Feb. 2, 1960 2 Sheets-Sheet 1

INVENTOR.
William H. Letz
BY
William P. Porcelli
atty

May 23, 1961  W. H. LETZ  2,985,211
FEED CUTTER
Filed Feb. 2, 1960  2 Sheets-Sheet 2
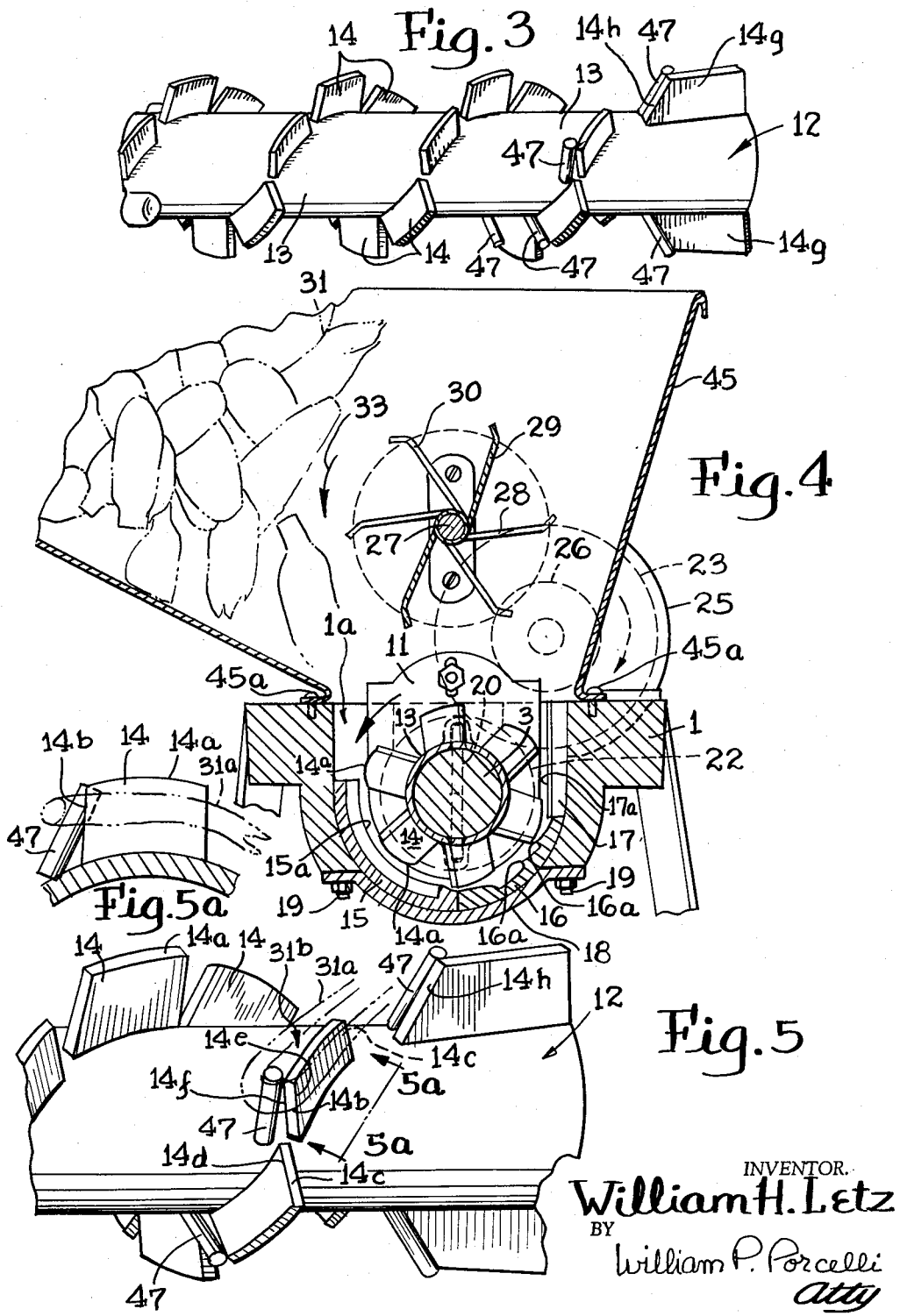

2,985,211
FEED CUTTER

William H. Letz, Crown Point, Ind., assignor to The Letz Manufacturing Company, Crown Point, Ind., a corporation of Indiana Filed Feb. 2, 1960, Ser. No. 6,151
18 Claims. (Cl. 146—79)

This invention relates to the art of feed cutters and particularly to an auger type embodied in apparatus also having grinding means used in conjunction with it.

A common type of feed cutter and grinder comprises a rotating auger type cutter having cutter blades arranged helically around its periphery. The helical positioning of the cutter blades acts to force or propel the feed supplied to it in a direction determined by the direction of the helix and its rotation. The outer ends of the cutter blades are spaced closely to the walls of the cutter housing which walls are provided with raised sharpened edges which react with the ends of the cutter blades to rough cut the feed. As the cutter rotates, the feed is carried longitudinally of the cutter where it is directed to fine grinding means which is often in the form of circular rough faced grinding discs positioned face to face. Rotation of one of the discs relative to the other causes the rough cut feed passed between them to be finely cut or ground, at which time it is exhausted through an outlet and directed by suitable means to a feed storage bin or other device.

One of the principal difficulties with this type of feed cutter and grinder has been its inability to properly grind husk type feed such as freshly picked corn with its husks or shucks on which is commonly referred to as "snap corn." This condition exists when the corn is dry and especially when the corn is moist. In fact, applicant does not know of any prior auger type cutter capable of grinding "snap corn." In order to grind it, it has been necessary to employ a much lower capacity, more expensive and heavy duty type cutter employing a rotating flywheel cutter head which forces the feed through a cutting screen or other devices.

It is the principal object of this invention to provide an improved feed cutter and grinder which is capable of properly grinding husk type feed such as moist "snap corn" which was hitherto impossible with such a device.

The reason why the auger type cutter has been unsuccessful is because all of the cutters used have been of a design which would not prevent the husks or shucks of the corn from building up on the periphery of the cutter until the machine is clogged and its capacity reaches zero, which usually occurs after attempting to grind only a few bushes. This has been a problem for many years and applicant has overcome the problem by proper design of the cutter. He has found that the difficulty can be overcome by the addition of stripper rods properly positioned on the cutter blades attached to the cutter.

These and other objects and advantages of the invention should become apparent upon reference to the accompanying drawings in which:

Fig. 3 shows a feed cutter embodying the improvements of the invention;

Fig. 4 shows a partial sectional view of the device shown in Fig. 1 taken along the line 4—4;

Fig. 5 shows a view of the right end of the cutter shown in Fig. 3; and

Fig. 5a shows a partial sectional view along the line 5a—5a of Fig. 5.

Figure 1:
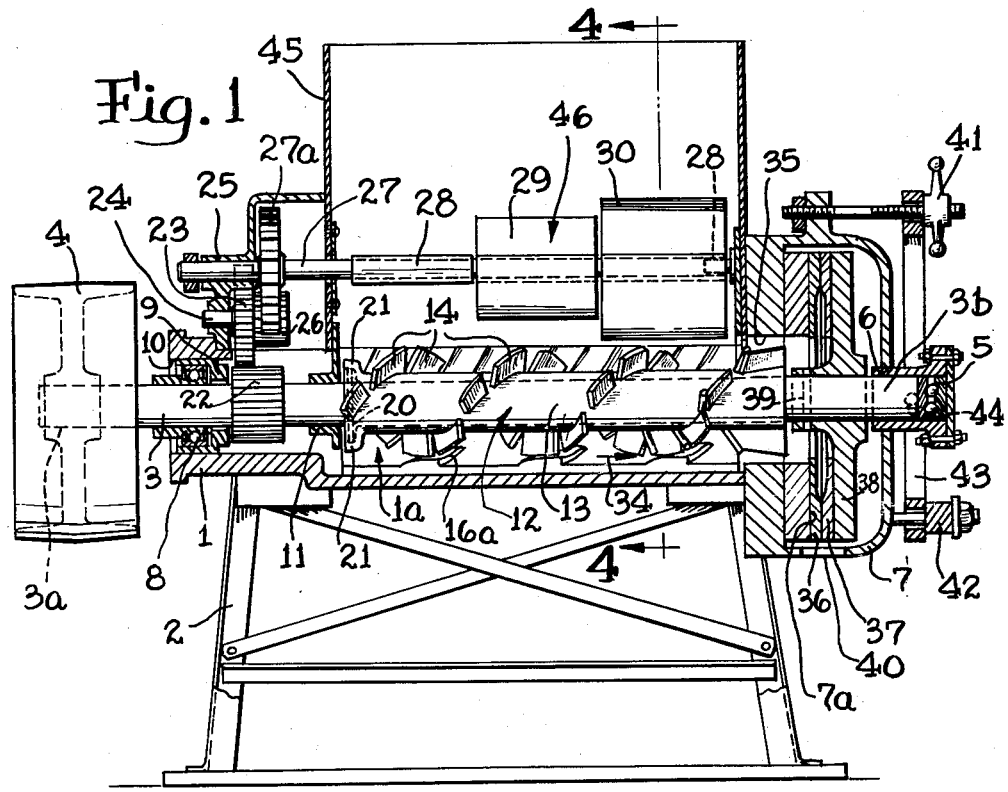
Fig. 1 shows a side elevation in cross-section of a feed cutter and grinder device embodying the improved cutter of this invention.

A typical structure embodying the invention as especially shown in Fig. 1 comprises a main housing 1 mounted on a support frame 2 which can either be mounted on the floor as shown or easily supported on a wheeled device to provide mobility for moving it to a convenient place of use. The main housing 1 is provided with a central longitudinal main shaft 3 which is provided with a pulley 4 at its free end 3a which can be rotated by means of a belt drive from a convenient power source to cause rotation of the main shaft 3. The other end 3b of the shaft 3 is journalled in a thrust bearing 5 which is mounted for slidable movement in an opening 6 in a grinder housing 7. The grinder housing 7 is secured to an end wall of the main housing 1. Intermediate the two ends 3a and 3b of the main shaft 3, but close to the end 3a, the shaft 3 is journalled in a bearing 8 held by a cylindrical bearing holder 9. The holder 9 is in turn fit into a cylindrical opening 10 in the main housing 1. Further support to the main shaft 3 is provided by a sleeve 11 secured to the walls of the main housing 1.

Within the main confines 1a of the main housing 1 is positioned the cutter 12 which has a body in the form of a sleeve 13 telescoped around the main shaft 3. The cutter 12 is provided with cutter blades 14 arranged in helical paths around the sleeve 13 to impart an auger-like shape to the cutter 12. The cutter 12 is locked in a driving connection to the main shaft 3 by means of a pin 20 whose ends engage in cavities of projections 21 on diametrically oposite sides of the sleeve 13.

Secured to the internal walls of the main housing 1 are plates 15, 16 and 17 which are provided with raised sharpened cutting edges 15a, 16a and 17a which are positioned close to the path of travel of the outer ends 14a of the cutters 14 to provide a cutting action between them when the cutter 12 is rotated. Below the level of the plates 15 and 16 is a support plate 18 which provides a backing for the plates 15 and 16. It is secured by screws 19 to the main housing 1. Although not shown, the plates 15, 16, 17 and 18 can be made adjustable in the housing 1 so that the cutting edges 15a, 16a and 17a can be brought as close to the ends 14a of the cutter blades 14 as is required for good cutting results.

Between the sleeve 11 and the bearing 8, the main shaft 3 is provided with a main gear 22 engaging an idler gear 23 which is mounted on a shaft 24 journalled in cantilever in a gear housing 25. The idler gear 23 has an integral reduction gear 26 attached to it which engages and drives a feeder shaft 27. The feeder shaft 27 is journalled at its gear end in the gear housing 25 and at its other end to a stud shaft 28 extending into a hole in the end of the feeder shaft 27. The stud shaft 28 is mounted on one wall of a sheet metal hopper 45 secured to the upper surface of the main housing 1 by means of screws 45a. The feeder shaft 27 has mounted thereon three double bladed paddles 28, 29 and 30, each mounted angularly one hundred and twenty degrees apart from the one next to it with the effect that all six of the blades of the three paddles are provided with sixty degree angular spacing as viewed particularly in Fig. 4. These paddles together form the feeder 46 which is used to force the feed material, such as corn 31, into the path of the cutter 12. The gearing as described between the main shaft 3 and the feeder shaft 27 is such that when the cutter 12 is rotated in the direction of the arrow 32, the feeder is rotated in the same angular direction as shown by the arrow 33.

As the corn or other feed material is being coarsely cut by the action of the cutter 12, the cutter blades 14 which are arranged in the helix around the cutter sleeve 13 cause the cut feed to be transported in the direction of the arrow 34 until it passes through the opening 35 in the grinder housing 7. Then it passes into the openings between two annular grinding discs 36 and 37. Disc 36 is in a fixed mounting on the end of the grinder housing wall 7a while disc 37 is mounted to rotate with a rotatable disc holder 38. This disc holder 38 is mounted in a fixed position on the main shaft 3 by means of a pin 39. As the shaft rotates, so then does the disc 37. The faces of the grinding discs 36 and 37 are embossed with irregular cutting edges which pulverize the rough cut feed material passed between them and then, by gravity, it falls out of the outlet 40 of the grinder housing 7. Although not shown, it is possible to place a pickup chute at this outlet 40 which can lead into a powered blower or auger device for delivering the ground feed material to any desired location.

In order to provide the desired amount of pressure between the grinding discs 36 and 37, the thrust bearing 5 is slidable through the wall of the grinder housing 7, as previously described. Since the thrust bearing 5 rests against the end of the main shaft 3, inward movement of the bearing 5 causes the shaft 3 to move inward longitudinally to thereby cause the disc 37 to move closer to the disc 36. The movement of this bearing 5 is controlled by adjustment of the threaded means 41 and 42 which controls the relative position of a yoke 43 which is pivoted on a pin 44 to the housing of the bearing 5.

In operation, the corn or other feed material is dropped into the hopper 45 and the feeder 46 forces the corn into the region of the cutter blades 14. After the corn is cut by the cutter 12, it is carried along by the cutter blades 14, through the opening 35, and between the grinding discs 36 and 37 where it is finely ground or pulverized.

The improvements of this invention primarily involve the improved design of the cutter 12 and relate to the addition of stripper rods 47 welded or otherwise joined to the leading edges of some of the cutter blades 14.

Figure 2:
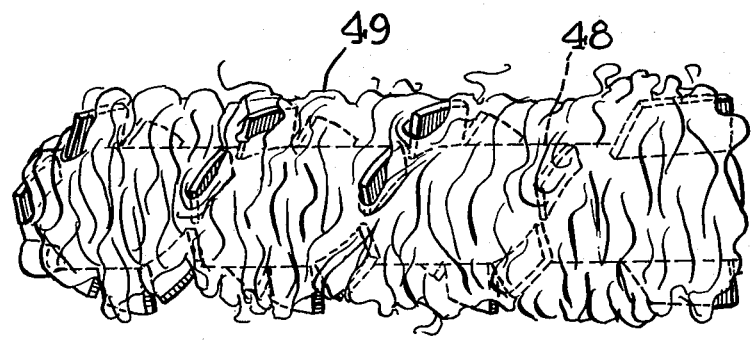
Fig. 2 shows the condition of a cutter without the improved construction of this invention as it appears after being wrapped excessively with husk type material such as found on corn.

In Fig. 2 is shown a cutter 48 which is identical to the cutter 12 of this invention except that the stripper rods 47 are missing. The drawing is intended to show the condition of the cutter 48 after being employed in a machine of the type shown in Figs. 1 and 4 in place of the improved cutter 12, and when used to grind typical "snap corn" with the husks still on. The result shown is that which happens after only a few bushels of corn are ground. The corn shucks or husks 49 are so tightly wound around and caught on the cutter blades that the cutting is reduced to zero and so, likewise, is the capacity of the machine. This necessitates cleaning of the husks 49 from the cutter 48 before cutting operation of the machine can again begin. Since it is impractical to shut down the machine every few bushels, other more expensive and lower capacity machines have been used in place of the auger type cutter machines, although the tendency has always been to want to use the auger type cutter machine because of its high capacity and economy.

Applicant discovered that, merely by adding the stripper rods 47 as he has done to the cutter, it eliminates the build up of corn husks and other similar material so well that the cutter can be used to cut even "snap corn" of the moist variety and still keep the cutter substantially as clean as shown in Fig. 3 so that the capacity of the machine is not materially reduced by wrappings and the cutting action is maintained efficiently.

It is important that the stripper pins be positioned at an angle or slope with respect to the cutter blades 14 as shown in Fig. 5a. The slope has been found to be necessary to overcome the hooking action of the front surfaces 14b which tends to hold the husks wrapped on the cutters. However, it is also important that the front surfaces 14b of the cutter blades be as close to radially of the cutter as possible in order to provide the necessary hooking action to force the corn into the cutting regions, between the cutter blade ends 14a and the cutting edges 15a, 16a and 17a of the plates 15, 16, and 17. To characterize the requirements in another way, an almost radial edge is required for hooking the husks, while a sloped edge is required to cause the husks to be stripped from the cutter blades. Applicant has provided both to the extent required to obtain the beneficial effects of both.

During the hooking of the husks, they are urged between the adjacent surfaces 14b and 14c to effectuate the cutting action between the sharpened corners 14d and 14e of these surfaces. Therefore, the stripper rods 47 are located to the outside of the adjacent corners 14f of the surfaces 14b where they do not interfere with the cutting action. Also, the rounded surfaces of the stripper rods 47 assist in allowing the husks to be more easily stripped than if they were sharpened corners which would tend to cut into the husks and retard their removal. Since the stripper rods 47 are to one side of the cutter blades 14, when a husk, as indicated at 31a in Fig. 5, does wrap around a stripper rod 47 and the surface 14b of a cutter blade 14, a space 31b naturally occurs between the husk and the cutter blade. The result is that the husk has less area of contact with the cutter blade and, so, it is believed that this provides less drag between the two so that stripping is further facilitated.

It should be noted that the final two cutter blades 14g on the leading end of the cutter 12 are of a different shape than the others because they extend into the opening 35 of the main housing and act more as paddles rather than cutters to encourage movement of the cut corn into the grinders. Also, since they are not used in this region to hook the corn, their forward surfaces 14h are sloped the same extent as the stripper rods 47 to encourage stripping.

In practice, with the shape and approximate proportions of a cutter 12 as indicated, it is only necessary to position stripper rods 47 on the leading eight cutter blades 14 to obtain the desired results. Obviously, more can be added to blades 14, but this would seem to only reduce the output of the machine by introducing rounded surfaces which in no way contribute to the cutting of the feed material. If less than eight blades are provided with stripper rods, the effect does not seem to be as good and build up of husks on the cutters may occur.

Although only a single embodiment of the invention has been shown and described, it should be clearly understood that it can be made in many different ways without departing from the true scope of the invention as defined by the appended claims.

I claim:

1. A feed cutter device comprising a main housing, a main drive shaft mounted for rotation on said housing, cutting edges on the inside wall of the housing, a cutter mounted on said shaft for rotation therewith, said cutter having blades arranged in a helical path around the cutter with the outer ends of said blades following a path closely adjacent to said cutting edges when the cutter is rotated, said blades being provided with stripper rods of cylindrical form secured adjacent the forward edges of the blades.

2. A feed cutter device comprising a main housing, a main drive shaft mounted for rotation on said housing, cutting edges on the inside wall of the housing, a cutter mounted on said shaft for rotation therewith, said cutter having blades arranged in a helical path around the cutter with the outer ends of said blades following a path closely adjacent to said cutting edges when the cutter is rotated, said blades being provided with stripper rods of cylindrical form secured adjacent and to one side of the forward edges of the blades.

3. A feed cutter device comprising a main housing, a main drive shaft mounted for rotation on said housing, cutting edges on the inside wall of the housing, a cutter mounted on said shaft for rotation therewith, said cutter having blades arranged in a helical path around the cutter with the outer ends of the blades following a path closely adjacent to said cutting edges when the cutter is rotated, said blades being provided with stripper rods of cylindrical form secured adjacent the forward edges of the blades, each of said stripper rods being mounted with its axis at a slope with respect to the forward edge of its adjacent blade.

4. A feed cutter device comprising a main housing, a main drive shaft mounted for rotation on said housing, cutting edges on the inside wall of the housing, a cutter mounted on said shaft for rotation therewith, said cutter having quadrilaterally shaped blades extending approximately radially therefrom and arranged in a helical path around it with the outer ends of the blades following a path closely adjacent to said cutting edges when the cutter is rotated, said blades being provided with rounded stripper surfaces secured adjacent to the forward edges of the blades relative to the direction of rotation of cutter.

5. A feed cutter device comprising a main housing, a main drive shaft mounted for rotation on said housing, cutting edges on the inside wall of the housing, a cutter mounted on said shaft for rotation therewith, said cutter having quadrilaterally shaped blades extending radially therefrom and arranged in a helical path around it with the outer ends of the blades following a path closely adjacent to said cutting edges when the cutter is rotated, said blades being provided with rounded stripper portions at their forward edges relative to the direction of rotation of the cutter.

6. A feed cutter device as defined by claim 4 characterized by each of said stripper surfaces extending at a slope relative to its adjacent blade edge.

7. A feed cutter device as defined by claim 5 characterized by each of said stripper portions extending at an angle relative to its adjacent blade edge.

8. A feed cutter device of a type having main housing, a main drive shaft mounted for rotation on said housing, cutting edges on the inside wall of the housing, and a cutter, said cutter comprising a tubular sleeve telescoped out said drive shaft and connected to be rotated with said drive shaft, said sleeve having quadrilaterally shaped blades extending approximately radially therefrom and arranged in a helical path around it with the outer ends of the blades following a path closely adjacent to said cutting edges when the cutter is rotated, the forward and rear edges of each blade relative to the direction of rotation of the cutter being approximately parallel to each other and approximately perpendicular to said sleeve, the forward edges of some of the blades having rounded stripper surfaces which are sloped rearwardly and radially away from the sleeve.

9. A feed cutter device of a type having a main housing, a main drive shaft mounted for rotation on said housing, cutting edges on the inside wall of the housing, and a cutter, said cutter comprising a tubular sleeve telescoped onto said drive shaft and connected to be rotated with it, said sleeve having blades extending approximately radially therefrom and arranged in a helical path around it with the free ends of the blades defining a path closely adjacent to said cutting edges when the cutter is rotated, the forward and rear edges of each blade relative to the direction of rotation of the cutter being approximately perpendicular to said sleeve, the forward edges of some of the blades having rounded stripper surfaces which are sloped rearwardly and radially away from the sleeve and positioned to one side of the blades.

10. A feed cutter device of a type having a main housing, a main drive shaft mounted for rotation on said housing, cutting edges on the inside wall of the housing, and a cutter, said cutter comprising a cylindrical body connected to be rotated with said drive shaft, said body having cutter blades extending approximately radially therefrom and arranged at spaced intervals from each other successively in a helical path around it with the outer ends of the blades defining a circular path closely adjacent to said cutting edges when the cutter is rotated, the forward and rear edges of each blade relative to the direction of rotation of the cutter being approximately perpendicular to said sleeve, each of the forward edges of some of the blades each having a rounded stripper surface which is sloped rearwardly and radially away from the body relative to the forward edge of its respective blade.

11. A feed cutter device of a type having a main housing, a main drive shaft mounted for rotation on said housing, cutting edges on the inside wall of the housing, and a cutter, said cutter comprising a cylindrical body connected to be rotated with said drive shaft, said body having cutter blades extending approximately radially therefrom and arranged at spaced intervals from each other successively in a helical path around it with the outer ends of the blades defining a circular path closely adjacent to said cutting edges when the cutter is rotated, the forward and rear edges of each blade relative to the direction of rotation of the cutter being approximately perpendicular to said sleeve, each of the forward edges of some of the blades adjacent the exit end of the cutter having a rounded stripper surface which is sloped rearwardly and radially away from the body relative to the forward edge of its respective blade.

12. A feed cutter device as defined by claim 11 characterized by each of said rounded stripper surfaces being positioned laterally to one side of its respective blade.

13. A feed cutter device of a type having a main housing, a main drive shaft mounted for rotation on said housing, cutting edges on the inside wall of the housing, and a cutter, said cutter comprising a cylindrical body connected to be rotated with said drive shaft, said body having cutter blades extending approximately radially therefrom and arranged at spaced intervals from each other successively in a helical path around it, the helical positioning of the blades creating an auger for transporting material delivered to the cutter toward an exit, the outer ends of the blades defining a circular path closely adjacent to said cutting edges when the cutter is rotated to thereby cause said material to be cut between the blade ends and the cutting edges, the forward edges of the blades being approximately perpendicular to the body of the cutter to provide hooking surfaces for hooking the material and forcing it into the regions of the closely adjacent cutting edges and blades, each of the forward edges of some of the blades having a rounded stripper surface which is sloped rearwardly and radially away from the body relative to the forward edge of its respective blade to thereby oppose the hooking action of the blades and allow the hooked material to be stripped from the blades upon continued rotation of the cutter.

14. A cutter for a feed cutter device of a type having a main housing, a main drive shaft mounted for rotation on said housing to rotate said cutter, and cutting edges on the housing for reacting with the cutter comprising, a tubular sleeve having quadrilaterally shaped blades extending radially therefrom and arranged in a helical path around it with at least some of the outer ends of the blades extending equal distances radially of the sleeve, the forward and rear edges of each blade relative to the ordinary direction of rotation of the cutter when assembled on the feed cutter device being approximately parallel to each other and approximately perpendicular to said sleeve, the forward edges of some of the blades having rounded stripper surfaces which are sloped rearwardly and radially away from the sleeve.

15. A cutter for a feed cutter device of a type having a main housing, a main drive shaft mounted for rotation on said housing to rotate said cutter, and cutting edges on the housing for reacting with the cutter comprising, a cylindrical body having cutter blades extending approximately radially therefrom and arranged at spaced intervals from each other successively in a helical path around it with the outer ends of some of the blades extending equal distances radially of the body, the forward and rear edges of each blade relative to the ordinary intended direction of rotation of the cutter being approximately perpendicular to said body, each of the forward edges of some of the blades adjacent the discharge end of the cutter having a rounded stripper surface which is sloped rearwardly and radially away from the body relative to the forward edge of its respective blade.

16. A cutter as defined by claim 15 characterized by each of said rounded stripper surfaces being positioned laterally to one side of its respective blade.

17. A cutter for a feed cutter device of a type having a main housing, a main drive shaft for rotating said cutter on said housing, and cutting edges on the housing for reacting with the cutter comprising, a cylindrical body having blades extending approximately radially therefrom and arranged in a helical path around it, said blades being provided with rounded stripper surfaces secured adjacent to the edges of the blades forward of the blades relative to the ordinary direction of rotation of the cutter.

18. A cutter as defined by claim 17 characterized by each of said stripper surfaces extending at a slope relative to its respective adjacent blade edge.

No references cited.